United States Patent [19]
Kobayashi et al.

[11] Patent Number: 5,742,048
[45] Date of Patent: Apr. 21, 1998

[54] SUCKING FAILURE DETECTING DEVICE

[75] Inventors: Shigeharu Kobayashi; Satoshi Kinoshita; Koji Shimada, all of Ishikawa, Japan

[73] Assignee: Shibuya Kogyo Co., Ltd., Ishikawa, Japan

[21] Appl. No.: 667,808

[22] Filed: Jun. 20, 1996

[30] Foreign Application Priority Data

Jun. 30, 1995 [JP] Japan .................. 7-188692

[51] Int. Cl.$^6$ .................. H01J 40/14; B23K 1/00
[52] U.S. Cl. .................. 250/222.1; 228/41; 228/246; 250/559.4
[58] Field of Search .................. 250/221, 222.1, 250/559.4; 356/375; 228/246, 254, 41

[56] References Cited

U.S. PATENT DOCUMENTS 5,601,229  2/1997  Nakazato et al. .................. 228/246
5,615,823  4/1997  Noda et al. .................. 228/103

FOREIGN PATENT DOCUMENTS 8-97218  4/1996  Japan .................. H01L 21/321

*Primary Examiner*—Stephone B. Allen
*Attorney, Agent, or Firm*—Sughrue, Mion, Zinn, Macpeak & Seas, PLLC

[57] ABSTRACT

A sucking failure detecting device built into an apparatus which transfers an object by sucking the object onto a sucking hole of a sucking head of the apparatus, the detecting device comprises: a light-emitting device emitting light and disposed on a movement path of the sucking head; and a light-receiving device disposed inside the sucking head which is made of light-shielding material, the light-receiving device receiving the light emitted by the light-emitting device and passing through the sucking hole.

15 Claims, 3 Drawing Sheets

SUCKING FAILURE DETECTING DEVICE

BACKGROUND OF THE INVENTION

1. Field of the Invention

This invention relates to a sucking failure detecting device for detecting whether objects to be transferred by a sucking head is sucked onto sucking holes of the head, and more particularly to a sucking failure detecting device used for a soldering ball supplying device in which a sucking head operates to transfer soldering balls from a soldering ball supplying unit onto a BGA (ball grid array) substrate by sucking soldering balls onto the sucking holes. In this case, the sucking failure detecting device detects whether any one of the sucking holes fails to suck the soldering ball.

2. Description of the Prior Art

A soldering ball supplying device has a sucking head which has a plurality of sucking holes to suck soldering balls thereonto corresponding to an associated BGA sustrate. More specifically, soldering balls are sucked onto the sucking holes of the head, and transferred onto the BGA sustrate. If any one of the soldering balls is not transferred to the BGA substrate, no complete electrode is formed thereon, that is, the resultant base board is unacceptable. Hence, it is essential to detect the failure in sucking the soldering ball onto any one of the sucking holes of the head. If this failure occurs, it is necessary to suck the soldering balls all over again.

Heretofore, in order to detect whether any one of the sucking holes fails to suck the soldering ball thereonto, an image processing device is utilized. More specifically, the sucking head having the sucking holes adapted to suck the soldering balls is made of a transparent material such as glass through which light passes. And reflecting means and diffracting means image the shades of the soldering balls, and the image processing device detects the shade. However, the above detecting method is disadvantageous in that it is necessary to employ relatively intricate optical means such as reflecting means and diffracting means, and in addition the image processing device is expensive, and that the material of the sucking head is limited to a transparent material such as glass.

SUMMARY OF THE INVENTION

In view of the foregoing, an object of the invention is to provide a sucking failure detecting device in which a light source and a photosensor are employed as means for detecting the failure in sucking the objects to be transferred, and the sucking head is made of a light-shielding material (except sucking holes thereof), and the photosensor detects whether light emitted from the light source passes through the sucking holes of the head, whereby it can be positively determined at low cost whether any one of the sucking holes fails to suck the object thereonto.

To solve the above problems, there is provided a sucking failure detecting device built into an apparatus which transfers an object by sucking the object onto a sucking hole of a sucking head of the apparatus, the detecting device comprising: a light-emitting device emitting light and disposed on a movement path of the sucking head; and a light-receiving device disposed inside the sucking head which is made of light-shielding material, the light-receiving device receiving the light emitted by the light-emitting device and passing through the sucking hole.

DETAILED DESCRIPTION OF THE PREFERRED EMBODIMENT

Figure 1:
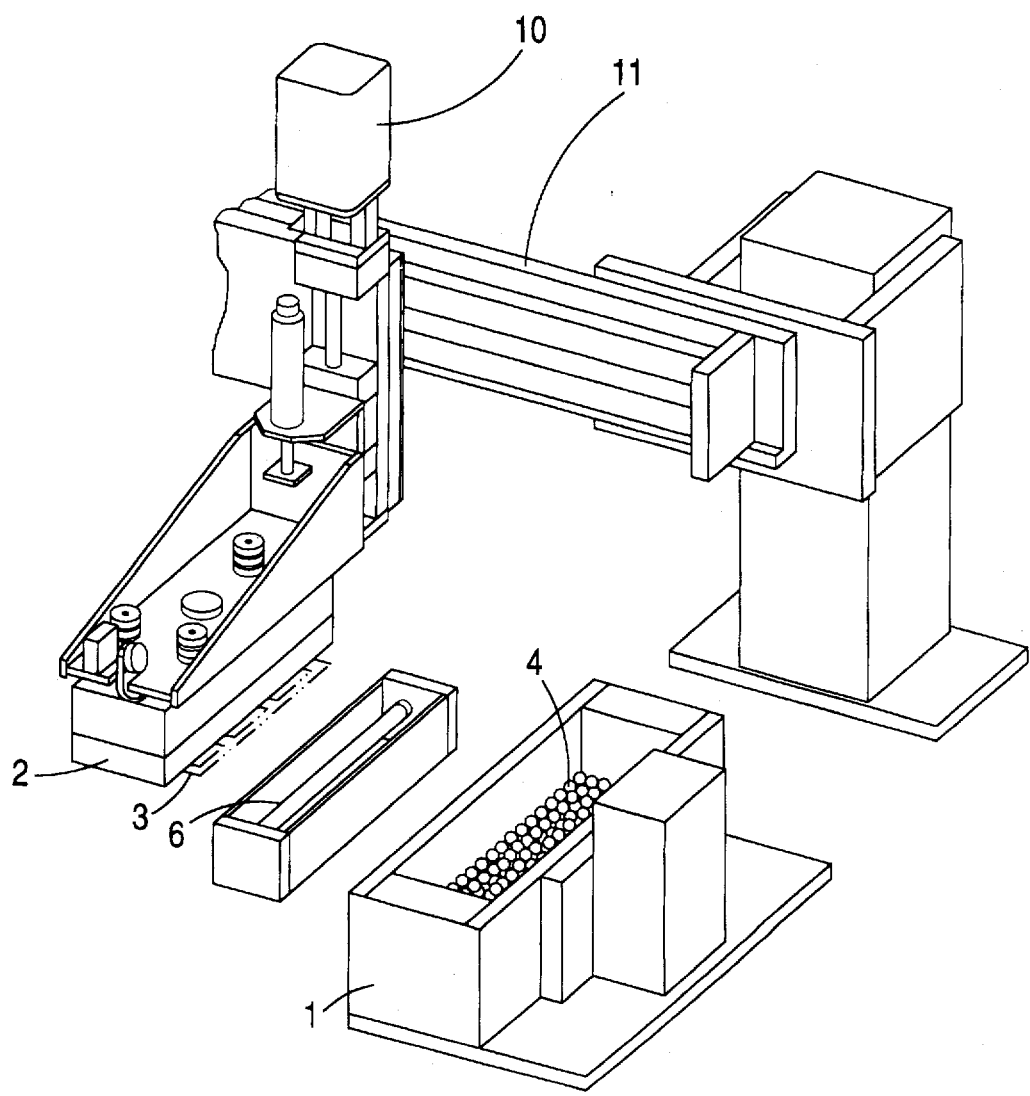
FIG. 1 is a perspective view showing a soldering ball supplying device which is an embodiment of the invention.
Figure 2:
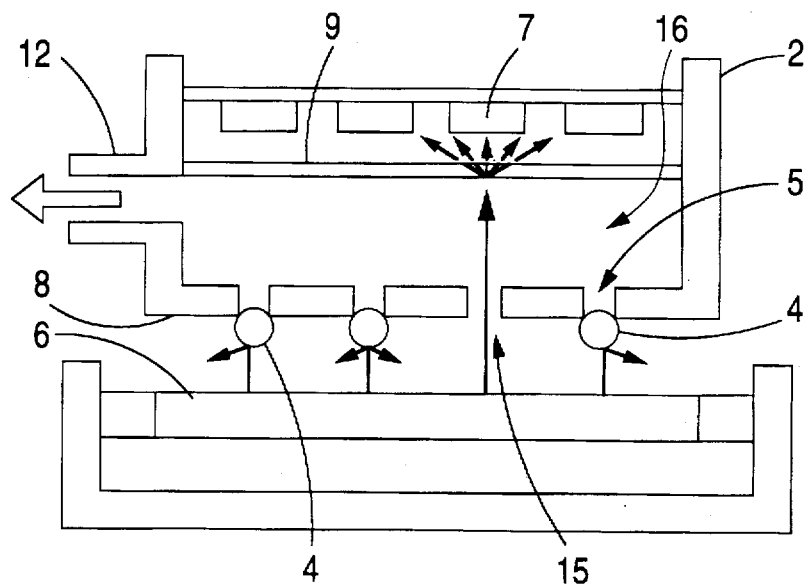
FIG. 2 is an explanatory view showing a state that a sucking hole of a sucking head fails to suck a soldering ball thereonto.
Figure 3:
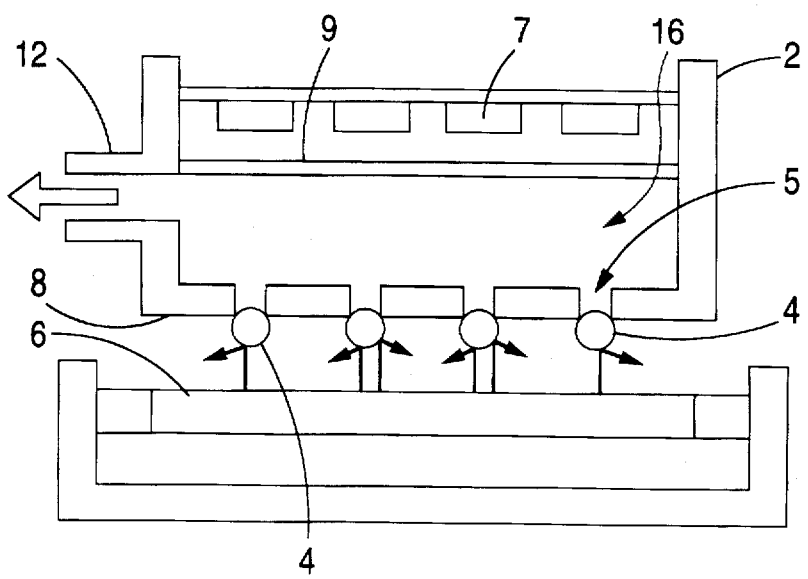
FIG. 3 is an explanatory view showing a state that all the sucking holes of the sucking head have sucked the soldering balls thereonto.

A preferred embodiment of the invention will be described with reference to the accompanying drawings. FIG. 1 is a perspective view showing a soldering ball supplying device which employs an embodiment of the invention. FIG. 2 is an explanatory view for a description of an operation of detecting the failure in sucking holes of a sucking head fails to suck a soldering ball. FIG. 3 is an explanatory view for a description of the fact that all the sucking holes of the head have sucked the soldering balls.

In those figures, reference numeral 1 designates a ball supplying unit; 2, the sucking head; and 3, a strip which has three BGA substrates (a BGA strip). The soldering ball supplying device operates as follows: As shown in FIG. 3, soldering balls 4 in the ball supplying unit 1 are sucked onto the sucking holes 5 which are formed in the sucking head 2. The soldering balls 4 thus sucked are transferred to the BGA strip 3.

The sucking failure detecting device of an embodiment according to the present invention comprises a light emitting-device which is provided outside the sucking head 2, and a light-receiving device provided in the sucking head 2. In the embodiment shown in FIG. 1, the light-emitting device is a light source 6, and the light-receiving device is photo-sensors 7. The light source 6 is, for instance, a tungsten light bulb, halogen light bulb or the like, which is constant in the quantity of output light. The light source 6 is disposed on a movement path of the sucking head 2 in such a manner that it faces the bottom wall 8 of the sucking head 2 in which the sucking holes are formed (hereinafter referred to as "a sucking hole forming wall 8", when applicable). On the other hand, the light source may be placed far away from the present detecting device and an optical fiber or the like may be used for leading the light emitted by the light source.

The sucking head 2 is in the form of a box made of light-shielding material. The bottom of the box 8 faces the light source 6. A predetermined number of sucking holes 5 are formed in the bottom wall 8, permitting the transmission of light. The box-shaped sucking head 2 has an opening in its side wall. The opening is formed into a coupling outlet 12 which is coupled to a vacuum system (not shown). A connecting tube of light-shielding material is connected to the coupling outlet 12, thus not permitting the entrance of light to enter the sucking head through the coupling outlet 12.

The sucking head 2 has a diffusing board 9 in the upper portion above the coupling outlet 12, which is used to keep a closed space 16 below the difusing board 9 vacuous and to diffuse light. In the embodiment, the diffusing board 9 is made of a milky white glass plate or acrylic plate. In the case where the light source 6 is great in the quantity of light, the light diffusing board 9 may be omitted. On the top wall of the box-shaped sucking head 2, photosensors 7 which has high sensitivity (being able to detect even extremely weak light) are provided. In the present embodiment, the photosensors 7 are photodiodes. The number of photosensors 7 may be only one; however, in order to achieve the sucking failure detecting operation with high accuracy, it is preferable to use several photo-sensors 7.

Now, the operation of the sucking failure detecting device thus constructed will be described.

First, some of the soldering balls 4 in the ball supplying unit 1 are sucked onto the sucking holes 5 of the sucking head 2 by evacuation. The relatively large arrow shown in the left part of FIGS. 2 and 3 designates the evacuation which is performed to suck the soldering balls. Thereafter, the sucking head which has sucked the soldering balls 4 onto the sucking hole 5 is moved horizontally (right and left) by a Y-axis drive motor (not shown), and vertically (up and down) by a Z-axis drive motor 10, to transfer the soldering ball 4 onto the BGA base board 3.

While the head 2 is moving along a Y-axis movement guide 11 towards the BGA strip 3, it is caused to pass over the light source provided in the path of movement. At this moment, it is detected if all the sucking holes 5 have sucked the soldering balls. The detection may be carried out while the head 2 is being moved in the above-described manner, or by temporarily stopping it over the light source 6.

If, in this operation, even only one sucking hole 5 has no soldering ball, then light leaks through it, so that the sucking failure is detected. This state is as shown in FIG. 2. That is, if, when the head 2 is moved over the light source 6, any one of the sucking holes 5 of the head 2 has no soldering ball, light enters the head 2 as indicated by the arrow (extended upwardly in FIG. 2), and then is diffused by the diffusing board 9, so that it is detected by the photosensors 7 which are composed of photodiode. The light thus detected is converted into an electrical signal, which is applied to an amplifier, so that it is determined that at least one of the sucking holes has no soldering ball, and an "NG (failure)" signal is applied to a control unit. In response to the NG signal, in the soldering ball supplying device, the movement of the sucking head to the BGA strip 3 is stopped, and the soldering balls are sucked all over again.

In the case where, on the other hand, all of the sucking holes 5 have the soldering balls, respectively, as shown in FIG. 3 no light from the light source 6 is allowed to enter the sucking head 2, and accordingly the photosensors 7 sense no light, and no NG signal is applied to the control unit. Hence, the sucking head 2 is moved to the BGA strip 3 as it is. In the embodiment, as was described above, it is detected when at least one of the sucking holes of the head fails to suck the soldering ball, so that the soldering balls 4 are regularly supplied at all times.

In the embodiment shown in the accompanying drawing, the first detecting means provided outside the sucking head 2 is the light source 6, and the second detecting means provided in the sucking head 2 is the photosensor 7; however, the invention is not limited thereto or thereby. It may be modified as follows. That is, in an other embodiment, the light-receiving device may be provided outside the sucking head 2, while the light emitting device may be provided inside the sucking head 2. Accordingly, in the other embodiment, the light-receiving device must be provided in a dark room.

Figure 4:
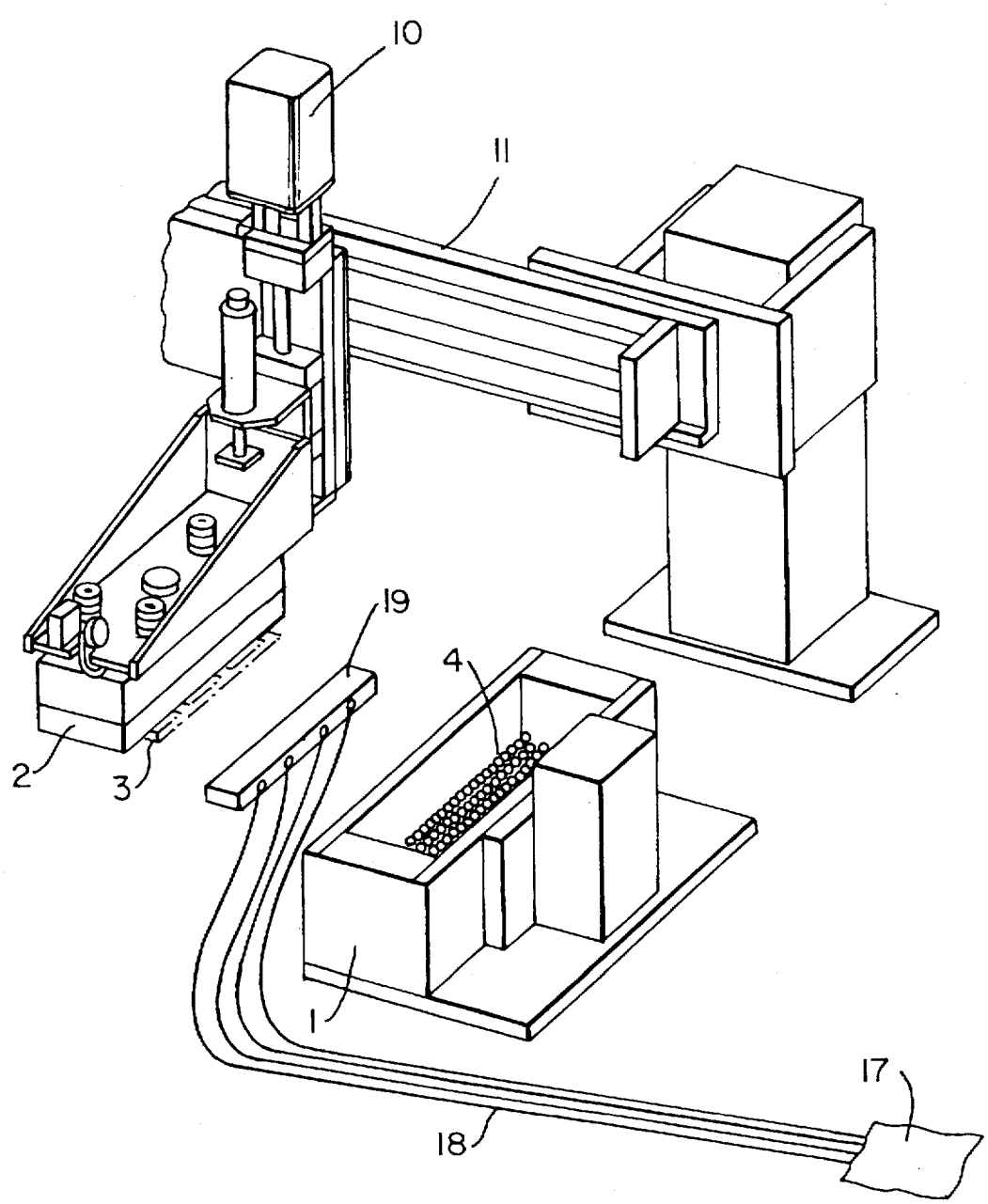
FIG. 4 is a perspective view showing a soldering ball supplying device which is a second embodiment of the invention which uses a remote light source and optical fiber arrangement.

FIG. 4 is a second embodiment of the invention which shows an optical fiber arrangement which employs a remote light source (17) connected to optical fibers (18) and a light emitter (19).

The effects of the invention will be described.

Firstly, with the failure detecting device of the invention, the light source and the photosensor are used to detect when any one of the sucking holes of the head fails to suck the object (such as a soldering ball). Hence, the device of the invention is much lower in detecting operation cost than the conventional image processing device.

Secondly, the device of the invention is not based on a method of detecting the shades of soldering balls. This fact dispenses with the employment of not only the image processing device but also the reflecting means and diffracting means. That is, the device of the invention is simplified in structure as much.

What is claimed is:

1. A sucking failure detecting device built into an apparatus which transfers an object by sucking the object onto a sucking hole of a sucking head of the apparatus, the detecting device comprising:

a light-emitting device emitting light and disposed on a movement path of the sucking head;

a light-receiving device disposed inside the sucking head which is made of light-shielding material, the light-receiving device receiving the light emitted by the light emitting device and passing through the sucking hole; and a diffusing board disposed inside the sucking head and diffusing the light.

2. The sucking failure detecting device according to claim 1, wherein the light-emitting device comprises one of a tungsten light bulb and a halogen light bulb.

3. The sucking failure detecting device according to claim 1, wherein the light-emitting device comprises a light source placed far away from the detecting device and an optical fiber for leading the light emitted by the light source to the movement path of the sucking head.

4. The sucking failure detecting device according to claim 1, wherein the light-receiving device is disposed in a vacuous space formed in the sucking head.

5. The sucking failure detecting device according to claim 1, wherein the light-receiving device comprises a photodiode.

6. The sucking failure detecting device according to claim 1, wherein the light-receiving device comprises a plurality of photodiodes.

7. The sucking failure detecting device according to claim 1, wherein the diffusing board comprises one of a milky white glass plate and an acrylic plate.

8. A soldering ball supplying device comprising:

a ball supplying unit which stores a plurality of soldering balls;

a sucking head having a sucking hole, the sucking head sucking the soldering balls stored in the ball supplying unit onto the sucking hole;

driving means for driving the sucking head;

a light-emitting device emitting light; and a light-receiving device receiving the light emitted by the light-emitting device;

wherein the light-emitting device is disposed inside the sucking head which is made of light-shielding material and the light receiving device is disposed on a movement path of the sucking head driven by the driving means, and the light-receiving device receives the light passing through the sucking holes and a diffusing board disposed inside the sucking head and diffusing the light.

9. The soldering ball supplying device according to claim 8, wherein the light-emitting device comprises one of a tungsten light bulb and a halogen light bulb.

10. The sucking failure detecting device according to claim 8, wherein the light-emitting device comprises a light source placed far away from the detecting device and an optical fiber for leading the light emitted by the light source to the movement path of the sucking head.

11. The soldering ball supplying device according to claim 8, further comprising a diffusing board disposed inside the sucking head and diffusing the light.

12. The soldering ball supplying device according to claim 8, wherein the light-receiving device comprises a photodiode.

13. The soldering ball supplying device according to claim 8, wherein the light-receiving device comprises a plurality of photodiodes.

14. The soldering ball supplying device according to claim 8, wherein the driving means drives the sucking head horizontally and vertically.

15. The soldering ball supplying device according to claim 8, wherein the diffusing board comprises one of a milky white glass plate and an acrylic plate.

* * * * *